(12) United States Patent
Lee

(10) Patent No.: US 11,177,081 B2
(45) Date of Patent: Nov. 16, 2021

(54) FIXING DEVICE FOR FIXING PLURALITY OF ENERGY STORAGE CELLS, AND ENERGY STORAGE MODULE USING SAME

(71) Applicant: LS MTRON LTD., Anyang-si (KR)

(72) Inventor: Jung-Gul Lee, Anyang-Si (KR)

(73) Assignee: LS MTRON LTD., Anyang-si (KR)

( * ) Notice: Subject to any disclaimer, the term of this patent is extended or adjusted under 35 U.S.C. 154(b) by 154 days.

(21) Appl. No.: 16/465,032

(22) PCT Filed: Nov. 1, 2017

(86) PCT No.: PCT/KR2017/012272
§ 371 (c)(1),
(2) Date: May 29, 2019

(87) PCT Pub. No.: WO2018/101615
PCT Pub. Date: Jun. 7, 2018

(65) Prior Publication Data
US 2019/0287738 A1 Sep. 19, 2019

(30) Foreign Application Priority Data

Nov. 30, 2016 (KR) .......................... 10-2016-0161692
Jan. 26, 2017 (KR) .......................... 10-2017-0012684
Sep. 27, 2017 (KR) .......................... 10-2017-0125105

(51) Int. Cl.
*H01G 11/82* (2013.01)
*H01G 11/10* (2013.01)
(Continued)

(52) U.S. Cl.
CPC ............. *H01G 11/82* (2013.01); *H01G 11/10* (2013.01); *H01G 11/18* (2013.01); *H01G 11/78* (2013.01); *H01G 11/76* (2013.01)

(58) Field of Classification Search
CPC ................................ H01G 11/10; H01G 11/82
See application file for complete search history.

(56) References Cited

U.S. PATENT DOCUMENTS 5,140,744 A * 8/1992 Miller ................... A47B 87/00
29/730
9,706,671 B2 7/2017 Juventin et al.
2015/0111079 A1 4/2015 Juventin et al.

FOREIGN PATENT DOCUMENTS

CN 102034948 A 4/2011
CN 105845854 A 8/2016
(Continued)

OTHER PUBLICATIONS

International Search Report for related International Application No. PCT/KR2017/012272; report dated Jun. 7, 2018; (5 Pages).
(Continued)

*Primary Examiner* — Eric W Thomas
(74) *Attorney, Agent, or Firm* — K&L Gates LLP

(57) ABSTRACT

A fixing device for fixing a plurality of energy storage cells arranged in parallel to each other includes a body having a hole formed through an upper surface and a lower surface thereof to accommodate a part of at least one energy storage cell; a first coupling protrusion and a first accommodation portion formed at a first side surface of the body to be spaced apart in opposite directions by the same distance from a center of the first side surface, the first coupling protrusion and the first accommodation portion being shaped to engage with each other; and a second coupling protrusion and a second accommodation portion formed at a second side surface of the body, which is opposite to the first side surface, to be spaced apart in opposite directions by the same distance from a center of the second side surface.

15 Claims, 11 Drawing Sheets

(51) Int. Cl.
*H01G 11/18* (2013.01)
*H01G 11/78* (2013.01)
*H01G 11/76* (2013.01)

(56) References Cited

FOREIGN PATENT DOCUMENTS

| | | |
|---|---|---|
| CN | 105938887 A | 9/2016 |
| JP | 2004349446 A | 12/2004 |
| JP | 2009259752 A | 11/2009 |
| JP | 2015095594 A | 5/2015 |
| KR | 1020100119122 A | 11/2010 |
| KR | 20130024035 A | 3/2013 |
| KR | 1010341474 B1 | 12/2013 |
| KR | 20140008123 A | 1/2014 |
| KR | 20140093108 A | 7/2014 |
| KR | 1020140089653 A | 7/2014 |
| KR | 10-2015-0120916 A | 10/2015 |
| KR | 20150121987 A | 10/2015 |
| KR | 2020160002834 | 8/2016 |
| KR | 20160127980 A | 11/2016 |
| WO | 2013164332 A1 | 11/2013 |

OTHER PUBLICATIONS

Written Opinion for related International Application No. PCT/KR2017/012272; report dated Jun. 7, 2018; (7 Pages).

\* cited by examiner

US 11,177,081 B2

FIXING DEVICE FOR FIXING PLURALITY OF ENERGY STORAGE CELLS, AND ENERGY STORAGE MODULE USING SAME

CROSS REFERENCE TO RELATED APPLICATIONS

The present application is a National Stage of International Application No. PCT/KR2017/012272 filed on Nov. 1, 2017, which claims priority to Korean Patent Application No. 10-2016-0161692 filed on Nov. 30, 2016, Korean Patent Application No. 10-2017-0012684 filed on Jan. 26, 2017 and Korean Patent Application No. 10-2017-0125105 filed on Sep. 27, 2017 in the Republic of Korea, the entire contents of each hereby incorporated by reference.

FIELD OF TECHNOLOGY

The present disclosure relates to an energy storage cell such as an ultra-capacitor, and more particularly, to a fixing device for fixing a plurality of energy storage cells and an energy storage module using the fixing device.

BACKGROUND ART

A representative example of an energy storage cell is an ultra-capacitor. The ultra-capacitor is also called a super capacitor, which is an energy storage device with intermediate characteristics between an electrolytic capacitor and a secondary battery. The ultra-capacitor is a next-generation electric energy source that can be used in combination with a secondary battery and can also replace a secondary battery due to its high efficiency and semi-permanent lifetime characteristic.

The ultra-capacitor is often used instead of a storage battery in applications where maintenance is not easy and long service life is required. The ultra-capacitor has fast charging and discharging characteristics and thus can be used as an auxiliary power source for mobile communication information devices such as mobile phones, notebooks, and PDAs. Also, the ultra-capacitor is very suitable as a main power source or an auxiliary power source for electric vehicles, night road lamps, UPS (Uninterrupted Power Supply), and so on, which require high capacity.

In order to use the ultra-capacitor as a high-voltage cell, a high-voltage module having several thousand Farads or several hundred bolts is required. The high-voltage module may be configured by connecting a plurality of ultra-capacitors in a required number and disposing the ultra-capacitors in a case.

FIG. 1 is a perspective view showing a conventional energy storage module in which a plurality of ultra-capacitors are connected.

As shown in FIG. 1, the conventional energy storage module includes an ultra-capacitor array 10, fixing members 20, 30 for fixing the ultra-capacitor array 10, and a case 50 for accommodating them. The ultra-capacitor array 10 is configured by connecting electrode terminals of a plurality of ultra-capacitors by a bus bar 40 and then fixing them by a nut.

As shown in FIG. 1, in the ultra-capacitor array 10, the plurality of ultra-capacitors are arranged in parallel and fixed by fixing members 20, 30. The fixing members 20, 30 are generally injection molds. The voltage of the energy storage module is set according to the requirements of the customer, and at this time, the number of ultra-capacitors to be used depends on the voltage. Thus, when manufacturing energy storage modules of various voltages, the fixing members 20, 30 should be manufactured individually according to the number of ultra-capacitors used in each energy storage module. In this case, the cost of manufacturing the energy storage module increases.

RELATED LITERATURES

Patent Literature 1: Korean Patent Registration No. 10-1341474 (issued on Dec. 13, 2013)

DISCLOSURE

Technical Problem

The present disclosure is designed to solve the problems of the related art, and therefore, the present disclosure is directed to providing a fixing device for fixing a plurality of energy storage cells without changing a shape regardless of the number of energy storage cells, and an energy storage module using the fixing device.

Technical Solution

In one aspect of the present disclosure, there is provided a fixing device for fixing a plurality of energy storage cells arranged in parallel to each other, the fixing device comprising: a body having a hole formed through an upper surface and a lower surface thereof to accommodate a part of at least one energy storage cell; a first coupling protrusion and a first accommodation portion formed at a first side surface of the body to be spaced apart in opposite directions by the same distance from a center of the first side surface, the first coupling protrusion and the first accommodation portion being shaped to engage with each other; and a second coupling protrusion and a second accommodation portion formed at a second side surface of the body, which is opposite to the first side surface, to be spaced apart in opposite directions by the same distance from a center of the second side surface, the second coupling protrusion and the second accommodation portion being shaped to engage with each other.

The first accommodation portion and the second accommodation portion may include: a first sub accommodation portion shaped corresponding to the first coupling protrusion and the second coupling protrusion; a second sub accommodation portion having a greater width than the first sub accommodation portion; and an inclined third sub accommodation portion formed between the first sub accommodation portion and the second sub accommodation portion.

The first coupling protrusion and the second coupling protrusion may include: an inclined surface formed at an end thereof that is inserted into the first sub accommodation portion.

A bus bar mounting portion may be formed at the upper surface of the body to have a lower height than surroundings.

The first coupling protrusion and the first accommodation portion may be point-symmetrical to the second coupling protrusion and the second accommodation portion based on a center of the body.

The fixing device may further comprise a third coupling protrusion and a third accommodation portion formed at a third side surface of the body to have an interval therebetween, the third coupling protrusion and the third accommodation portion being shaped to engage with each other; and a fourth coupling protrusion and a fourth accommodation portion formed at a fourth side surface of the body, which is opposite to the third side surface, to be point-symmetrical based on a center of the body.

The hole of the body may include a negative electrode accommodation hole formed to accommodate a negative electrode terminal of one energy storage cell; and a positive electrode accommodation hole formed to accommodate a positive electrode terminal of another energy storage cell.

The fixing device may further comprise at least two first fixing protrusions formed on an inner circumference of the negative electrode accommodation hole at regular intervals and coupled to a groove formed in an outer circumference of the one energy storage cell; and at least two second fixing protrusions formed on an inner circumference of the positive electrode accommodation hole at regular intervals and coupled to a groove formed in an outer circumference of the another energy storage cell.

Inclined surfaces of the first fixing protrusion and the second fixing protrusion at which the energy storage cell is inserted may have a smaller slope than inclined surfaces opposite thereto.

The fixing device may further comprise two fixing means insert holes symmetrically formed in the upper surface of the body at both sides between the negative electrode accommodation hole and the positive electrode accommodation hole.

The fixing device may further comprise polarity indicators formed at four apex portions of the upper surface of the body.

The fixing device may further comprise fixing means insert holes formed at four apex portions of the upper surface of the body.

The fixing device may further comprise a guide groove connected from the hole of the body to the outside of the body to serve as a moving passage of a wiring, the guide groove may be formed in the number of at least two respectively at upper, lower, left and right sides of the upper surface of the body, and the guide grooves formed in parallel sides may be point-symmetrical based on a center of the body.

A hooking protrusion may be formed on at least one side wall of each guide groove to prevent the wiring from being separated.

The fixing device may further comprise an extension portion configured to extend at the lower surface of the body from the hole to an empty space toward a side surface of the body.

In another aspect of the present disclosure, there is also provided an energy storage module, comprising: two energy storage cells arranged in parallel so that the energy storage cells have electrode terminals in opposite directions; a first fixing device configured to accommodate one side surface of the two energy storage cells; and a second fixing device configured to accommodate a side surface of the two energy storage cells opposite to the one side surface, wherein the first and second fixing devices include: a body having a negative electrode accommodation hole and a positive electrode accommodation hole formed through an upper surface and a lower surface thereof; a first coupling protrusion and a first accommodation portion formed at a first side surface of the body to be spaced apart in opposite directions by the same distance from a center of the first side surface, the first coupling protrusion and the first accommodation portion being shaped to engage with each other; and a second coupling protrusion and a second accommodation portion formed at a second side surface of the body, which is opposite to the first side surface, to be spaced apart in opposite directions by the same distance from a center of the second side surface, the second coupling protrusion and the second accommodation portion being shaped to engage with each other.

The energy storage module may further comprise a bus bar having two hollows through which positive electrode terminals and negative electrode terminals of the energy storage cells protruding to the outside from the negative electrode accommodation hole and the positive electrode accommodation hole passes; nuts fastened to the positive electrode terminals and the negative electrode terminals passing through the two hollows of the bus bar; and a heat dissipation pad installed in contact with the nut.

A side wall for guiding installation locations of the bus bar and the heat dissipation pad may be formed at the upper surface of the body, and the height of the side wall may be greater than the height of the nut protruding from the holes and stacked thereon and be smaller than the height of the heat dissipation pad.

Advantageous Effects

According to an embodiment, since the coupling protrusions of the fixing device act as wedges and maximize the contact area for the bonding force, it is possible to prevent the energy storage cells from being separated by frictional force.

According to an embodiment, when the energy storage cells are inflated so that the energy storage cells are pressed away from each other, the coupling protrusion and the accommodation portion of the fixing device prevent the energy storage cells from being separated.

According to an embodiment, since the energy storage cells are easily coupled and disassembled, the energy storage module may be easily reworked, thereby improving the productivity.

According to an embodiment, since the coupling protrusion of the fixing device has rounded corners and the accommodation portion is shaped corresponding thereto, it is possible to disperse the stress generated by the volume expansion and the like.

According to an embodiment, due to the fixing protrusion formed at the inner circumference of the hole of the fixing device, an air circulation path is formed between the inner circumference of the hole and the energy storage cell to efficiently dissipate heat generated from the energy storage cell.

According to an embodiment, since a plurality of energy storage cells can be fixed using several fixing devices of the same shape regardless of the number of energy storage cells, it is possible to reduce the manufacturing cost of the energy storage module.

According to an embodiment, energy storage modules can be coupled or separated using the block-type fixing device according to the desired voltage of the energy storage modules, thereby facilitating expansion and reduction of the energy storage modules.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
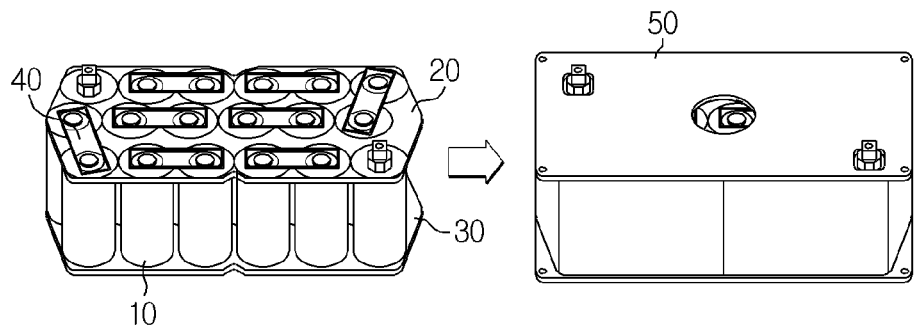
FIG. 1 is a perspective view showing a conventional energy storage module in which a plurality of ultra-capacitors are connected.
Figure 2:
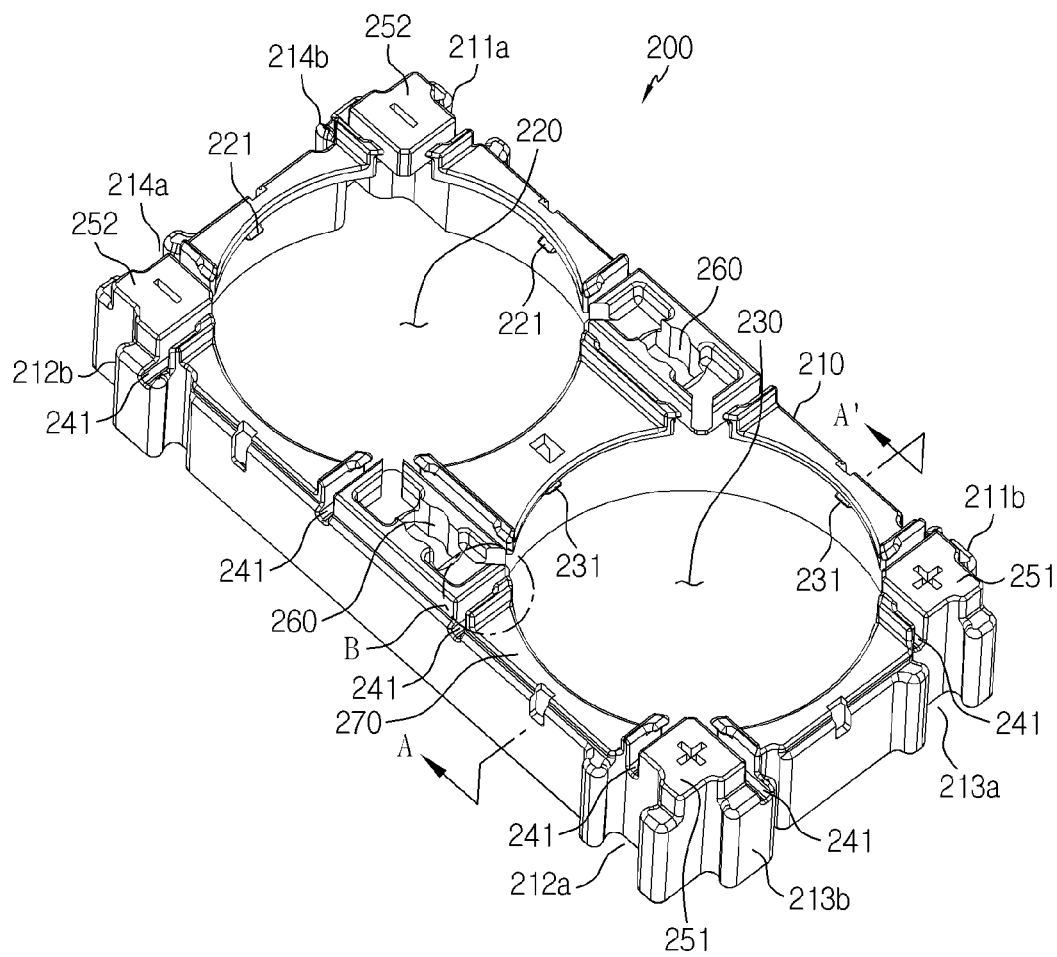
FIG. 2 is a perspective view showing a fixing device according to an embodiment of the present disclosure.

FIG. 2 is a perspective view showing a fixing device according to an embodiment of the present disclosure. Referring to FIG. 2, the fixing device 200 according to an embodiment of the present disclosure includes a body 210 having a hexahedral shape in which holes 220, 230 for accommodating a part of an energy storage cell are formed through an upper surface and a lower surface thereof, a plurality of coupling protrusions 211b, 212b, 213b, 214b formed at side surfaces of the body 210, and a plurality of accommodation portions 211a, 212a, 213a, 214a corresponding thereto. Preferably, the fixing device 200 is made of a plastic material and may be injection-molded, without being limited thereto.

The fixing device 200 according to this embodiment fixes two energy storage cells arranged in parallel. In the holes 220, 230 formed in the body 210 of the fixing device 200, terminal portions of the energy storage cells are accommodated, respectively. The hole 220 is a negative electrode accommodation hole in which a negative electrode terminal portion of the energy storage cell is accommodated, and the hole 230 is a positive electrode accommodation hole in which a positive electrode terminal portion of the energy storage cell is accommodated. In this embodiment, the diameters of the negative electrode accommodation hole 220 and the positive electrode accommodation hole 230 are different. This is because the negative electrode terminal portion and the positive electrode terminal portion of the energy storage cell have different diameters.

Preferably, the holes 220, 230 are shaped corresponding to the shape of the energy storage cell accommodated therein. In this embodiment, the energy storage cells accommodated in the holes 220, 230 have a cylindrical shape, and thus, the holes 220, 230 also have a cylindrical shape. In addition, the diameter of the entrance of the holes 220, 230 formed in the upper surface of the body 210 may be smaller than the diameter of the energy storage cell, and the diameter of the holes 220, 230 formed in the body 210 may be equal to or slightly larger than the diameter of the energy storage cell. Since the diameter of the entrances of the holes 220, 230 is smaller than the diameter of the energy storage cells, it is possible to prevent the energy storage cell from falling into entrance of the holes 220, 230.

As shown in FIG. 2, coupling protrusions 211b, 212b, 213b, 214b and accommodation portions 211a, 212a, 213a, 214a corresponding thereto are formed at four side surfaces of the body 210, respectively. Specifically, the coupling protrusion 211b and the accommodation portion 211a are formed with a regular interval on the first side surface of the body 210, the coupling protrusion 212b and the accommodation portion 212a are formed with a regular interval on the second side surface, the coupling protrusion 213b and the accommodation portion 213a are formed with a regular interval on the third side surface, and the coupling protrusion 214b and the accommodation portion 214a are formed with a regular interval on the fourth side surface. At this time, bent portions of the inner spaces of the accommodation portions 211a, 212a, 213a, 214a may have a rounded shape, and the coupling protrusions 211b, 212b, 213b, 214b are shaped corresponding thereto. If the corners of the inner spaces of the accommodation portions 211a, 212a, 213a, 214a have a right angle and the coupling protrusions 211b, 212b, 213b, 214b are shaped corresponding thereto, the stress caused by the volume expansion or the like may be concentrated to the right-angle corners of the coupling protrusions 211b, 212b, 213b, 214b, which may damage the corners. However, if the corners have a rounded shape, the stress may be dispersed by distributing the pressure.

The coupling protrusion 211b and the accommodation portion 211a at the first side surface of the body 210 should be spaced apart in opposite directions by the same distance from the center of the first side surface and be shaped correspondingly to engage with each other. In this way, when the two fixing devices 200 are connected in a long side direction, the holes 220, 230 of the two fixing devices 200 may be positioned opposite to each other. Here, if the two fixing devices 200 are connected in the long side direction in a state where the holes 220, 230 of the two fixing devices 200 are positioned opposite to each other, the first side surface of the first fixing device 200 may be connected to the second fixing device 200 such that the first side surface of the first fixing device 200 is in contact with the first side surface of the second fixing device 200. That is, when the two fixing devices 200 are connected, one fixing device 200 is connected by rotating 180 degrees. Specifically, the coupling protrusion 211b formed on the first side surface of the first fixing device 200 is accommodated in and coupled to the accommodation portion 211a formed in the first side surface of the second fixing device, and the coupling protrusion 211b formed on the first side surface of the second fixing device 200 is accommodated in and fixed to the accommodation portion 211a formed in the first side surface of the first fixing device.

Similarly, the coupling protrusion 212b and the accommodation portion 212a at the second side surface of the body 210 should be spaced apart in opposite directions by the same distance from the center of the second side surface and be shaped correspondingly to engage with each other. The reason is the same as the above case of the coupling protrusion 211b and the accommodation portion 211a at the first side surface of the body 210. That is, in this case, the second side surfaces of the two fixing devices 200 are connected in contact with each other in a state where the holes 220, 230 of the two fixing devices 200 are positioned opposite to each other.

Meanwhile, the coupling protrusion 213b and the accommodation portion 213a at the third side surface of the body 210 are point-symmetric to the coupling protrusion 214b and the accommodation portion 214a at the fourth side surface based on the center of the body 210. That is, at the third side surface and the fourth side surface parallel to each other, the coupling protrusion 213b on the third side surface and the accommodation portion 214a in the fourth side surface are located on a vertical line perpendicular to the third side surface and the fourth side surface, and ftl-se the accommodation portion 213a in the third side surface and the coupling protrusion 214b on the fourth side surface are located on a vertical line perpendicular to the third side surface and the fourth side surface. In addition, the coupling protrusions 213b, 214b formed on the third side surface and the fourth side surface have the same shape, and the accommodation portions 213a, 214a also have the same shape. Thus, when the short sides of the two fixing devices 200 are connected in contact with each other in a state where the holes 220, 230 of the two fixing devices 200 are positioned opposite to each other, the third side surface of the first fixing device 200 and the fourth side surface of the second fixing device 200 engage with each other.

In this embodiment, the diameter of the positive electrode terminal portion of the cylindrical energy storage cell is different from the diameter of the negative electrode terminal portion. However, in another embodiment, the diameter of the positive electrode terminal portion of the cylindrical energy storage cell may be equal to the diameter of the negative electrode terminal portion. In this case, the coupling protrusion 211b and accommodation portion 211a at the first side surface of the body 210 should be spaced apart by the same distance from the center of the first side surface and be shaped correspondingly to engage with each other, and also the coupling protrusion 212b and the accommodation portion 212a at the second side surface of the body 210 should be spaced apart by the same distance from the center of the second side surface and be shaped correspondingly to engage with each other, while the first side surface and the second side surface are point-symmetrical to each other based on the center of the body 210. That is, at the first side surface and the second side surface parallel to each other, the coupling protrusion 211b on the first side surface and the accommodation portion 212a in the second side surface are located on a vertical line perpendicular to the first side surface and the second side surface, and also the accommodation portion 211a in the first side surface and the coupling protrusion 212b on the second side surface are located on a vertical line perpendicular to the first side surface and the second side surface. In addition, the coupling protrusions 211b, 212b formed on the first side surface and the second side surface have the same shape, and the accommodation portions 211a, 212a also have the same shape. Thus, if the fixing device 200 depicted in FIG. 2 is rotated 180 degrees based on the center thereof, the positions of the coupling protrusion and the accommodation portion are maintained as they were. In this case, when connecting the two fixing devices 200, the first side surface of the first fixing device 200 and the second side surface of the second fixing device 200 may be connected to each other without rotation.

Though the coupling protrusions 211b, 212b, 213b, 214b and the accommodation portions 211a, 212a, 213a, 214a corresponding thereto are respectively formed at the four side surfaces of the body 210 in the above description, when a plurality of fixing devices 200 are connected in the long side direction, the coupling protrusions 213b, 214b and the accommodation portions 213a, 214a may not be provided at the side surfaces of the short side. Alternatively, when a plurality of fixing devices 200 are connected in the short side direction, the coupling protrusions 211b, 212b and the accommodation portions 211a, 212a may not be provided at the side surfaces of the long side.

Referring to FIG. 2, fixing protrusions 221, 231 are formed at regular intervals on the inner circumferences of the holes 220, 230. Specifically, the fixing protrusions 221 are formed at regular intervals on the inner circumference of the negative electrode accommodation hole 220, and the fixing protrusions 231 are formed at regular intervals on the inner circumference of the positive electrode accommodation hole 230. Preferably, four fixing protrusions 221, 231 are formed at 90 degree intervals on the inner circumferences of the holes 220, 230. Generally, the case of the energy storage cell is beaded to fix the electrode terminal to the case. Thus, the case of the energy storage cell has a beading portion concavely depressed inwards from the outside, and the fixing protrusions 221, 231 formed on the inner circumferences of the holes 220, 230 are coupled to the beading portion of the energy storage cell. As the fixing protrusions 221, 231 are coupled to the beading portion of the energy storage cell, the energy storage cell is fixed inside the holes 220, 230 of the fixing device 200. Due to the fixing protrusions 221, 231, a space is created between the inner circumferences of the holes 220, 230 and the energy storage cell, and this space serves as an air circulation path that emits heat generated from the energy storage cell to the outside. The fixing protrusions 221, 231 have a mountain shape so that an inclined surface thereof at a side where an energy storage cell is inserted has a relatively gentle slope and an inclined surface opposite thereto has a relatively steep slope. Accordingly, when the energy storage cell is inserted into the holes, and 230, the energy storage cell may be inserted smoothly and is not easily released after the completion of the insertion.

Figure 3:
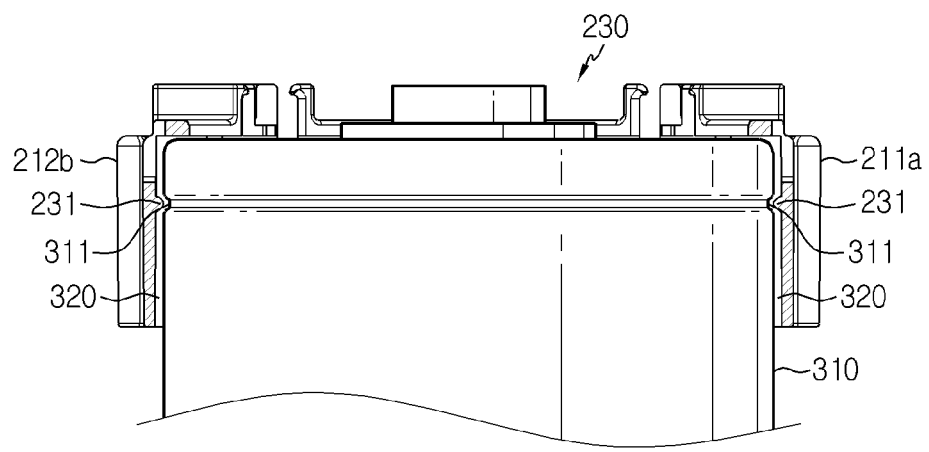
FIG. 3 is a cross-sectioned view, taken along the line A-A' of FIG. 2, when an energy storage cell is coupled into a positive electrode accommodation hole of the fixing device.

FIG. 3 is a cross-sectioned view, taken along the line A-A' of FIG. 2, when the energy storage cell is coupled into the positive electrode accommodation hole of the fixing device. As shown in FIG. 3, when the positive electrode terminal portion of the energy storage cell 310 is accommodated in and coupled to the positive electrode accommodation hole 230 of the fixing device 200, the fixing protrusion 231 formed on the inner circumference of the positive electrode accommodation hole 230 is coupled to a beading portion 311 formed at the outer circumference of the energy storage cell 310 to fix the energy storage cell 310. Thus, it is possible to prevent the energy storage cell 310 from being separated from the fixing device 200 due to external force. Also, due to the fixing protrusion 231, an air circulation path 320 is formed between the inner circumference of the hole 220 and the energy storage cell 310 to emit heat generated from the energy storage cell 310 to the outside.

Meanwhile, the beading portion of the positive electrode terminal portion and the beading portion of the negative electrode terminal portion may be formed at different positions at the energy storage cell 310. Correspondingly, the positions of the fixing protrusions 221, 231 formed on the inner circumferences of the negative electrode accommodation hole 220 and the positive electrode accommodation hole 230 may also be adjusted.

Referring to FIG. 2 again, the fixing device 200 includes a guide groove 241 formed at the upper surface of the body 210 to serve as a moving passage of a wiring and is connected from the holes 220, 230 of the body 210 to the outside of the body 210. At least two guide grooves 241 are respectively formed at upper, lower, left, and right sides of the upper surface of the body 210. The terminals of the energy storage cells accommodated in the holes 220, 230 should be connected using the wiring from the outside of the body 210, and the wiring should also be connected between the terminals of the energy storage cells of the two fixing devices 220 when the two fixing devices 200 are connected. For this reason, at least two guide grooves 241 are formed at the upper, lower, left and right sides of the upper surface of the body 210, respectively. In addition, the guide grooves connecting two holes 220, 230 may be formed symmetrically between the two holes 220, 230. The locations where the guide grooves 241 are formed may be selected in a similar way to the coupling protrusions 211*b*, 212*b*, 213*b*, 214*b* and the accommodation portions 211*a*, 212*a*, 213*a*, 214*a* respectively formed at the side surfaces of the body 210.

If the holes 220, 230 of the body 210 have different sizes at the fixing device 200, namely if the diameter of the positive electrode terminal portion of the cylindrical energy storage cell is different from the diameter of the negative electrode terminal portion, at least two guide grooves 241 formed at the long side portion of the upper surface of the body 210 should be spaced apart by the same distance from the center of the long side, and their passages should be are connected to each other. In another embodiment, if the holes 220, 230 have the same size, namely if the diameter of the positive electrode terminal portion of the cylindrical energy storage cell is identical to the diameter of the negative electrode terminal portion, at least two guide grooves 241 formed at the long side portion of the upper surface of the body 210 are spaced apart by the same distance from the center of the long side so that their passages should be are connected to each other. The guide grooves 241 respectively formed at the two long side portions are point-symmetrical to each other based on the center of the body 210. Meanwhile, the guide grooves 241 formed at the two short side portions of the upper surface of the body 210 are point-symmetrical to each other based on the center of the body 210.

Figure 4:
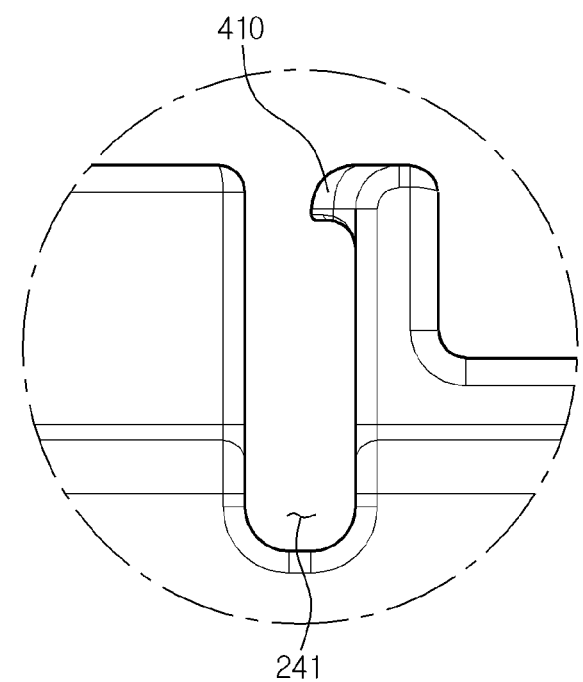
FIG. 4 is an enlarged cross-sectioned view showing a portion B of FIG. 2.

FIG. 4 is an enlarged cross-sectioned view showing a portion B of FIG. 2. As shown in FIG. 4, a hooking protrusion 410 for preventing the wiring inserted into the guide groove 241 from being separated is formed on one of both side walls of the guide groove 241 of the fixing device 200 toward the guide groove 241. The wiring inserted into the guide groove 241 is caught by the hooking protrusion 410 protruding toward the guide groove 241 and is not released to the outside. In addition, as shown in FIG. 4, the side walls of the guide groove 241 protrude to a predetermined height from the upper surface of the body 210. The side walls of the guide groove 241 serve not only to guide the wiring but also to guide a bus bar connecting the terminals of the energy storage cells protruding from the holes 220, 230 and a heat dissipation pad disposed thereon. That is, a bus bar mounting portion 270 is formed between the side walls of the guide groove 241 so that the bus bar is mounted thereto. Thus, the height of the side wall of the guide groove 241 is greater than the total height of the parts protruding from the holes 220, 230 and stacked thereon.

Referring to FIG. 2 again, the fixing device 200 according to an embodiment includes polarity indicators 251, 252 at four apex portions of the body 210. The polarity indicators 251, 252 indicate the polarity of the terminal of the energy storage cell which should be inserted into the holes 220, 230 formed in the body 210. The positive electrode polarity indicator 251 is indicated as '+' as shown in FIG. 2, which indicates that the positive electrode terminal portion of the energy storage cell is to be coupled to the positive electrode accommodation hole 230. The negative electrode polarity indicator 252 is indicated as '-' as shown in FIG. 2 to indicate that the negative electrode terminal portion of the energy storage cell is to be connected to the negative electrode accommodation hole 220. The polarity indicators 251, 252 indicate the polarity of the terminal of the energy storage cell which should be inserted in the holes 220, 230 and at the same time guide the connection direction of the two fixing devices 200.

Referring to FIG. 2, two bolt insert holes 260 are formed in the upper surface of the body 210 according to an embodiment so that bolts are inserted therethrough. The bolt insert holes 260 are symmetrically formed at both side surfaces between the two holes 220, 230. The plurality of energy storage cells fixed by the fixing device 200 are accommodated in a separate case. Thus, it is necessary to fix the case and the fixing device 200 to prevent the plurality of energy storage cells from moving inside the case. For this purpose, the bolt insert holes 260 are formed in the fixing device 200. A long bolt is inserted through the hole formed in the upper surface of the case and the bolt insert hole 260 formed in the fixing device 200, and then the long bolt exposed through the hole formed in the lower surface of the case is fastened using a nut, thereby strongly coupling the fixing device and the case.

The height of the polarity indicators 251, 252 and the bolt insert holes 260 is approximately identical to the height of the side walls of the guide groove 241. Thus, the bus bar mounting portion 270 has a lower height than the surroundings, namely the side walls of the guide groove 241, the bolt insert holes 260 and the polarity indicators 251, 252.

Figure 5:
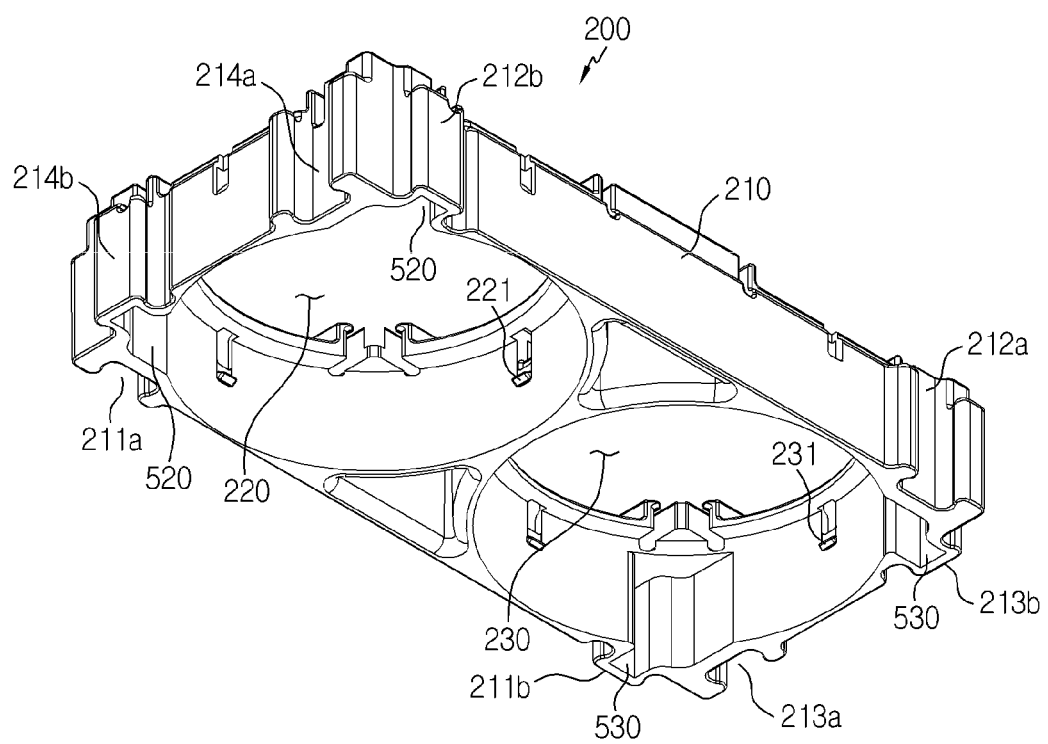
FIG. 5 is a perspective view showing a bottom surface of the fixing device of FIG. 2.

FIG. 5 is a perspective view showing a bottom surface of the fixing device of FIG. 2. As shown in FIG. 5, two holes 220, 230 are present in the fixing device 200, and the two holes 220, 230 are shaped corresponding to the energy storage cell. That is, the two holes 220, 230 have a cylindrical shape corresponding to the shape of the cylindrical energy storage cell. However, since the diameter of the entrance of the two holes 220, 230 in the upper surface of the fixing device 200 is smaller than the diameter of the two holes 220, 230 formed inside the fixing device 200, thereby preventing the energy storage cell inserted at the bottom surface of the fixing device 200 from passing through the entrance of the two holes 220, 230. Meanwhile, as shown in FIG. 5, the fixing device 200 includes extension portions 520, 530 that extend at the lower surface of the body 210 from the holes 220, 230 to an empty space toward the side surface of the body 210. By placing the extension portions 520, 530 in the empty space in this way, the material cost of the fixing device 200 manufactured by injection molding may be reduced. In addition, the energy storage cell may emit a lot of heat in use and be inflated due to the heat. If the extension portions 520, 530 are not provided in the empty space, the energy storage cell and the fixing device 200 may be damaged due to the inflation of the energy storage cell. However, if the extension portions 520, 530 are provided in the empty space, when the energy storage cell is inflated, the diameter of the holes 220, 230 is also increased, thereby preventing the fixing device 220 and the energy storage cell from being damaged.

Figure 6:
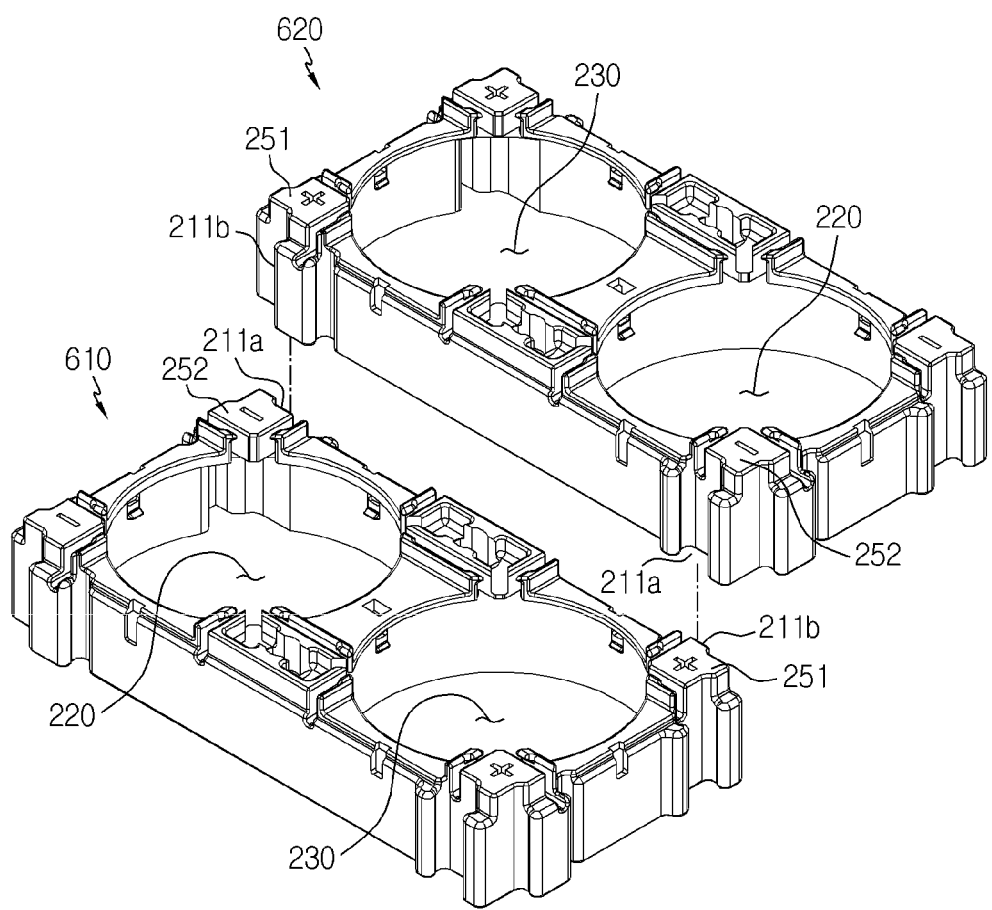
FIG. 6 is a perspective view for illustrating a coupling structure of two fixing devices having the same structure according to an embodiment of the present disclosure.

FIG. 6 is a perspective view for illustrating a coupling structure of two fixing devices having the same structure according to an embodiment of the present disclosure.

Referring to FIG. 6, the side surface of the first fixing device 610 at the long side and the side surface of the second fixing device 620 at the long side are connected to face each other. The second fixing device 620 is rotated 180 degrees based on the center thereof and is connected to the first fixing device 610 such that the negative electrode accommodation hole 220 of the first fixing device 610 and the positive electrode accommodation hole 230 of the second fixing device 620 are arranged side by side in the connection direction and the positive electrode accommodation hole 230 of the first fixing device 610 and the negative electrode accommodation hole 220 of the second fixing device 620 are arranged side by side in the connection direction.

The coupling protrusion 211*b* and the accommodation portion 211*a* formed at the side surface of the fixing devices 610, 620 at the long side are spaced apart by the same distance from the center of the corresponding side surface and are shaped correspondingly to engage with each other. Thus, when the second fixing device 620 rotated 180 degrees is connected to the first fixing device 610, the coupling protrusion 211*b* of the first fixing device 610 is coupled to and engaged with the accommodation portion 211*a* of the second fixing device 620, and the coupling protrusion 211*b* of the second fixing device 620 is coupled to and engaged with the accommodation portion 211*a* of the first fixing device 610.

Meanwhile, when the first fixing device 610 and the second fixing device 620 are connected, the guide groove 241 of the first fixing device 610 and the guide groove 241 of the second fixing device 620 are connected so that the wiring moves along the guide groove 241 from the first fixing device 610 to the second fixing device 620, or in an opposite direction.

Figure 7:
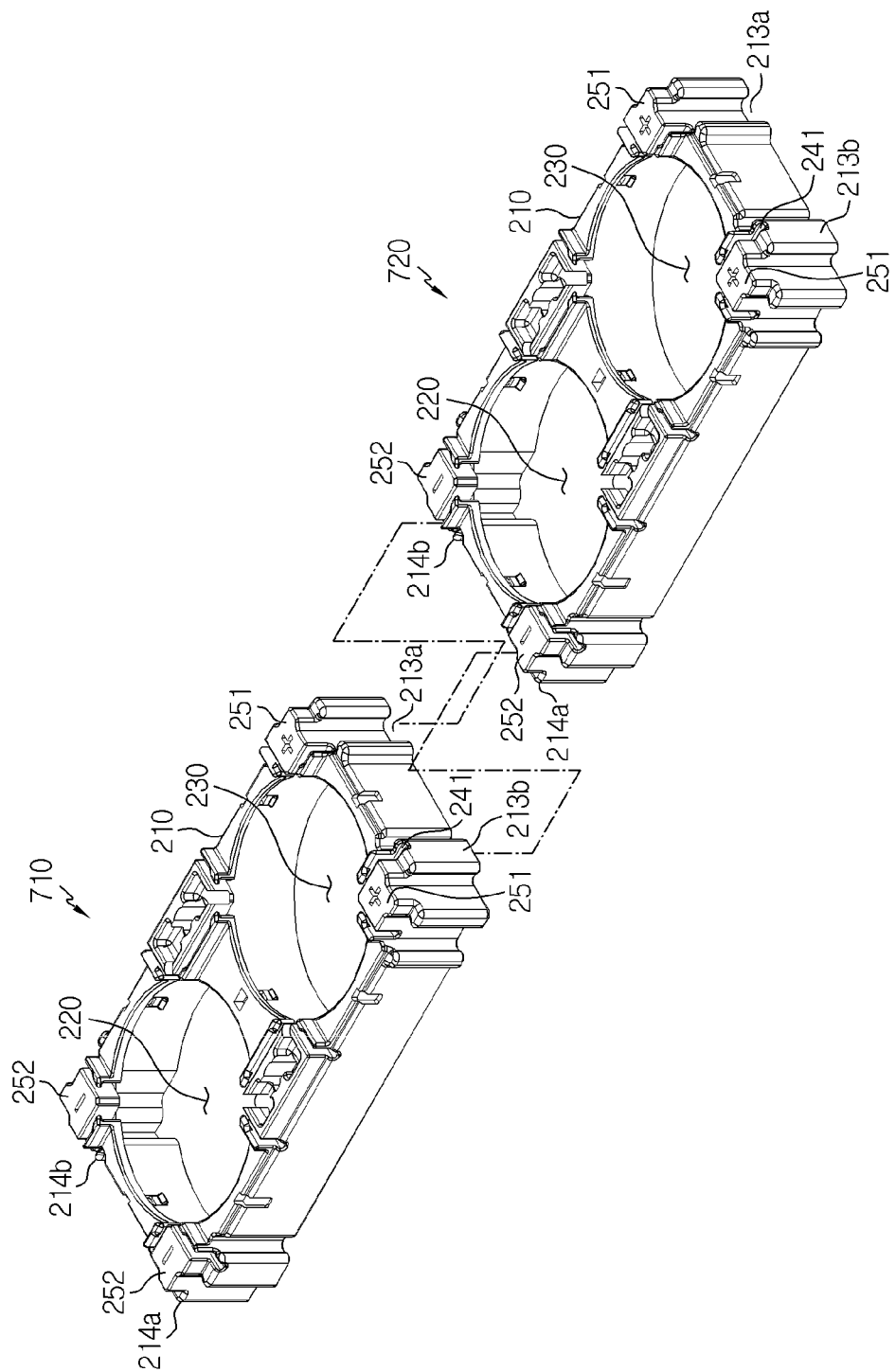
FIG. 7 is a perspective view for illustrating a coupling structure of two fixing devices having the same structure according to another embodiment of the present disclosure.

FIG. 7 is a perspective view for illustrating a coupling structure of two fixing devices having the same structure according to another embodiment of the present disclosure.

Referring to FIG. 7, the side surface of the first fixing device 710 at the short side and the side surface of the second fixing device 720 at the short side connected to face each other. The second fixing device 720 is arranged in the same structure as the first fixing device 710 without rotating and then connected to the first fixing device 710 so that the positive electrode accommodation hole 230 of the first fixing device 710 and the negative electrode accommodation hole 220 of the second fixing device 720 are arranged side by side in the connection direction.

The coupling protrusions 213*b*, 214*b* and the accommodation portions 213*a*, 214*a* formed at the side surfaces of the fixing devices 710, 720 at both short sides are point-symmetrical based on the center of the fixing devices 710, 720. Thus, if the side surface of the second fixing device 720 at the section side is connected to the side surface of the first fixing device 710 at the section side, the coupling protrusion 213*b* of the first fixing device 710 is coupled to and engaged with the accommodation portion 214*a* of the second fixing device 720, and the coupling protrusion 214*b* of the second fixing device 720 is coupled to and engaged with the accommodation portion 213*a* of the first fixing device 710.

Meanwhile, when the first fixing device 710 and the second fixing device 720 are connected, the guide groove 241 of the first fixing device 710 and the guide groove 241 of the second fixing device 720 are connected so that the wiring moves along the guide groove 241 from the first fixing device 710 to the second fixing device 720, or in an opposite direction.

Figure 8:
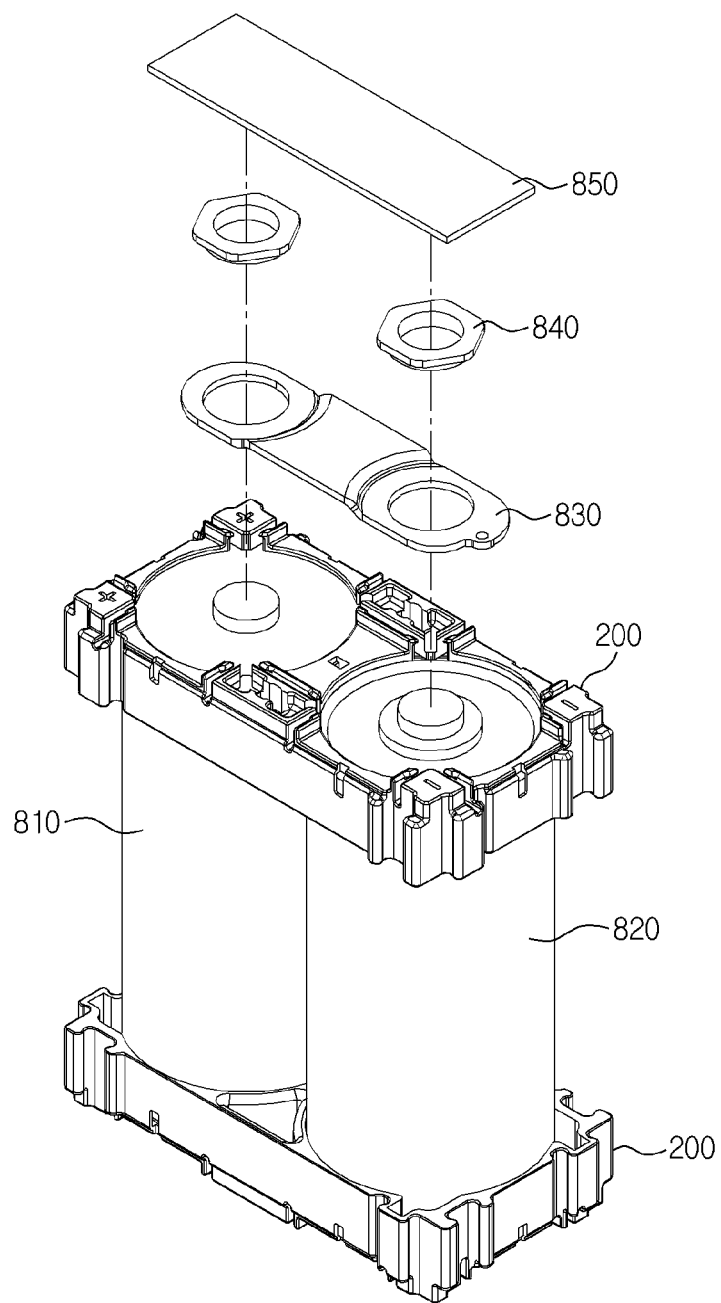
FIG. 8 is an explode perspective view showing a unit energy storage module according to an embodiment of the present disclosure.
Figure 9:
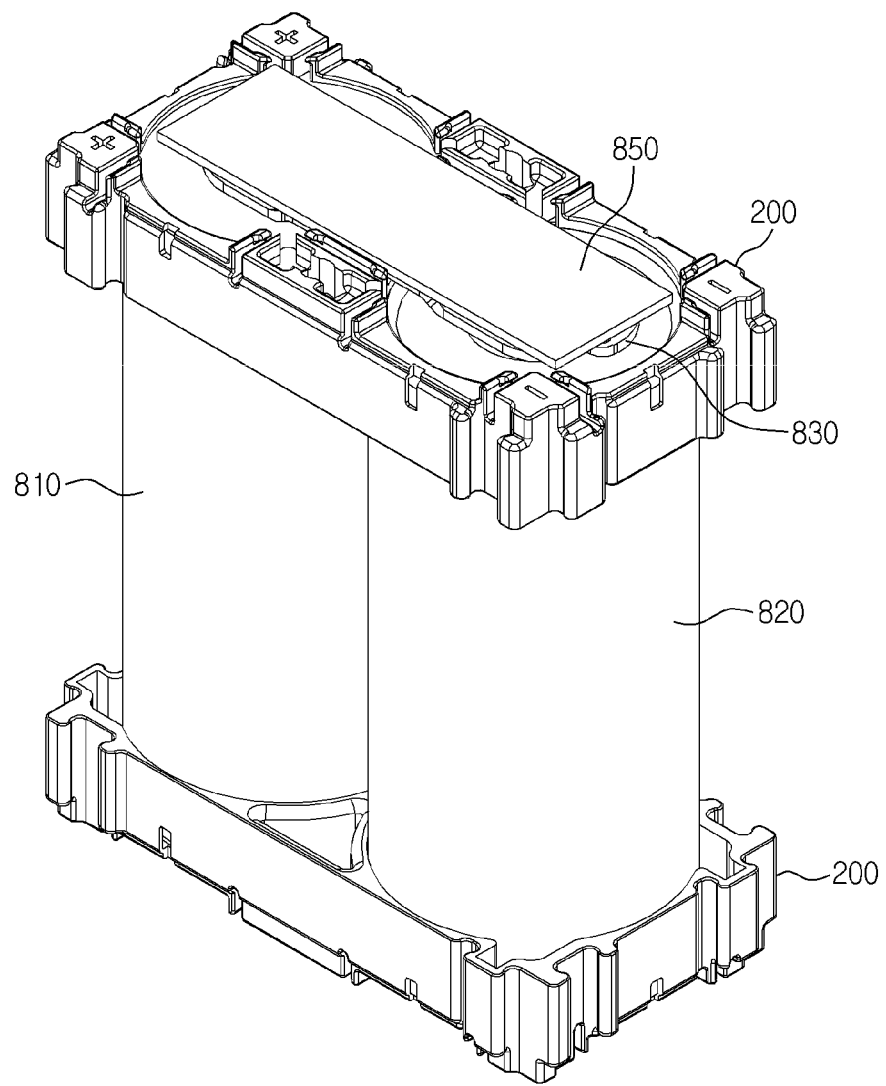
FIG. 9 is a perspective view of FIG. 8 in an assembled state.

FIG. 8 is an exploded perspective view showing a unit energy storage module according to an embodiment of the present disclosure, and FIG. 9 is a perspective view of FIG. 8 in an assembled state.

Referring to FIGS. 8 and 9, the unit energy storage module fixes two energy storage cells 810, 820 by using two fixing devices 200 having two holes 220, 230. The two energy storage cells 810, 820 are arranged in parallel so that their terminals are located oppositely, and then the two fixing devices 200 are fixed to cover the terminals, respectively. As described above, the negative electrode terminal portions of the energy storage cells 810, 820 are inserted into the negative electrode accommodation hole 220 of the fixing device 200, and the positive electrode terminal portions of the energy storage cells 810, 820 are inserted into the positive electrode accommodation hole 230. At this time, the fixing protrusions 221, 231 formed on the inner surfaces of the holes 220, 230 are coupled to the beading portion formed at the outer circumference of the energy storage cells 810, 820 so that the energy storage cells 810, 820 are not separated from the fixing device 200.

As shown in FIGS. 8 and 9, after two energy storage cells 810, 820 are fixed in parallel using two fixing device 200, a bus bar 830 is connected to the negative electrode terminal and the positive electrode terminal protruding through the holes 220, 230. The bus bar 830 has two hollows through which the positive electrode terminal and the negative electrode terminal of the energy storage cells 810, 820 may pass, and the positive electrode terminal and the negative electrode terminal protrude through the hollows. Threads are formed at the outer circumferences of the positive electrode terminal and the negative electrode terminal of the energy storage cells 810, 820, and thus the bus bar is fixed by fastening nuts to the positive electrode terminal and the negative electrode terminal passing through the bus bar. In addition, a heat dissipation pad 850 is coupled thereon.

The heat dissipation pad 850 is in contact with the nut 840 of the energy storage cells 810, 820 and the separate case to emit heat generated from the energy storage cells 810, 820. The heat dissipation pad 850 may include a heat conduction filler for heat transfer, such as metal powder or ceramic powder. The metal powder may be any one or a mixture of two or more of aluminum, silver, copper, nickel and tungsten. In addition, the ceramic powder may be silicone, graphite, or carbon black. In the embodiment of the present disclosure, the material of the heat dissipation pad 850 is not specially limited. Alternatively, the heat dissipation pad 850 may be made of a silicone synthetic rubber.

As described above, the side walls of the guide groove 241 of the fixing device 200 protrude to a predetermined height from the upper surface of the body 210. The side walls of the guide groove 241 serve not only to guide the wiring but also to guide the installation positions of the bus bar 830 and the heat dissipation pad 850 placed thereon. Thus, the height of the side walls of the guide groove 241 is preferably greater than the height of the nut protruding from the holes 220, 230 and stacked thereon and smaller than the height of the heat dissipation pad 850. If the height of the side wall is greater than the height of the heat dissipation pad 850, the heat dissipation pad 850 is not in contact with the case, undesirably.

Figure 10:
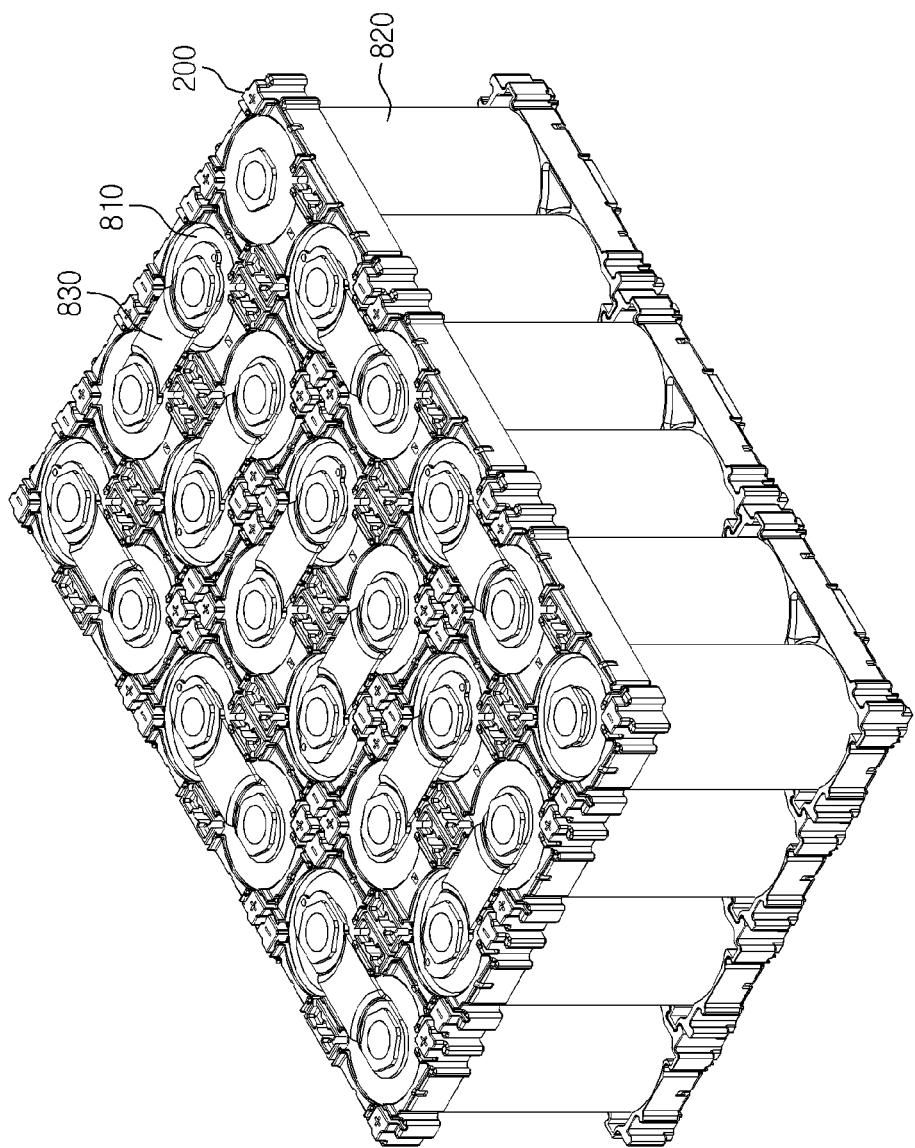
FIG. 10 is a perspective view showing an energy storage module in which twelve unit energy storage modules of FIG. 9 are connected.

FIG. 10 is a perspective view showing an energy storage module in which twelve unit energy storage modules of FIG. 9 are connected. As shown in FIG. 10, twelve unit energy storage modules of FIG. 9 may be connected to couple twenty-four energy storage modules in total. This is just an example, the above configuration may be extended further by connecting a desired number of energy storage modules by using the fixing device 200 according to the embodiment of the present disclosure.

Figure 11:
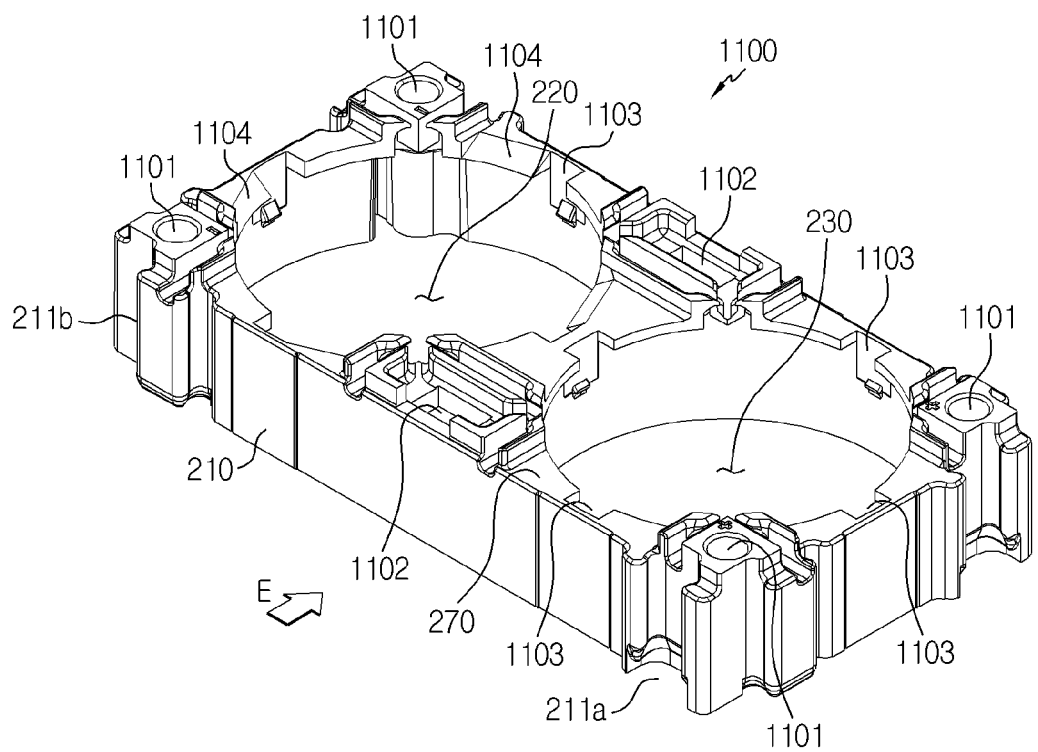
FIG. 11 is a perspective view showing a fixing device according to another embodiment of the present disclosure.

FIG. 11 is a perspective view showing a fixing device according to another embodiment of the present disclosure. The fixing device 1100 of this embodiment as shown in FIG. 11 is similar to the fixing device 200 of the former embodiment as shown in FIG. 2, and the different features from the fixing device 200 of the former embodiment as shown in FIG. 2 will be described.

In the fixing device 200 of the former embodiment as shown in FIG. 2, the bolt insert holes 260 are formed symmetrically at both side surface portions between the two holes 220, 230. Meanwhile, in the fixing device 1100 of this embodiment as shown in FIG. 11, holes 1102 symmetrically formed at both side surface portions between the two holes 220, 230 are not used for inserting the bolts but used as a moving passage of the wiring.

Also, in the fixing device 200 of the former embodiment as shown in FIG. 2, the polarizing indicators 251, 252 are provided at four apex portions of the body 210. Meanwhile, the fixing device 1100 of this embodiment as shown in FIG. 11 has bolt insert holes 1101 at four apex portions of the body 210. That is, instead of the polarity indicators 251, 252, the bolt insert holes 1101 are formed at the corresponding positions.

In addition, in the fixing device 200 of the former embodiment as shown in FIG. 2, the rims of the upper surfaces of the two holes 220, 230 form a smoothly connected circle. Meanwhile, in the fixing device 1100 of this embodiment as shown in FIG. 11, at least one slit 1103 is formed in the rim of the upper surface of the two holes 220, 230. As the at least one slit 1103 is formed, an elastic force is suitably applied when an energy storage cell is inserted into and fixed to the fixing device 200, thereby facilitating the insertion of the energy storage cell.

Also, in the two holes 220, 230 of the fixing device 1100 of this embodiment as shown in FIG. 11, a partial rim portion 1104 of the rim of the upper surface of the negative electrode accommodation hole 220 is inclined. The negative electrode accommodation hole 220 accommodates the negative electrode terminal of the energy storage cell, and a PCB substrate and a connector are installed thereon. Here, since the partial rim portion 1104 is formed in an inclined shape, it is possible to prevent interference when the connector is installed. In this embodiment, the partial rim portion 1104 of the rim of the upper surface of the negative electrode accommodation hole 220 is inclined. However, if the PCB substrate and the connector are installed in the positive electrode accommodation hole 230, a partial rim portion of the rim of the upper surface of the positive electrode accommodation hole 230 may be inclined.

Figure 12:
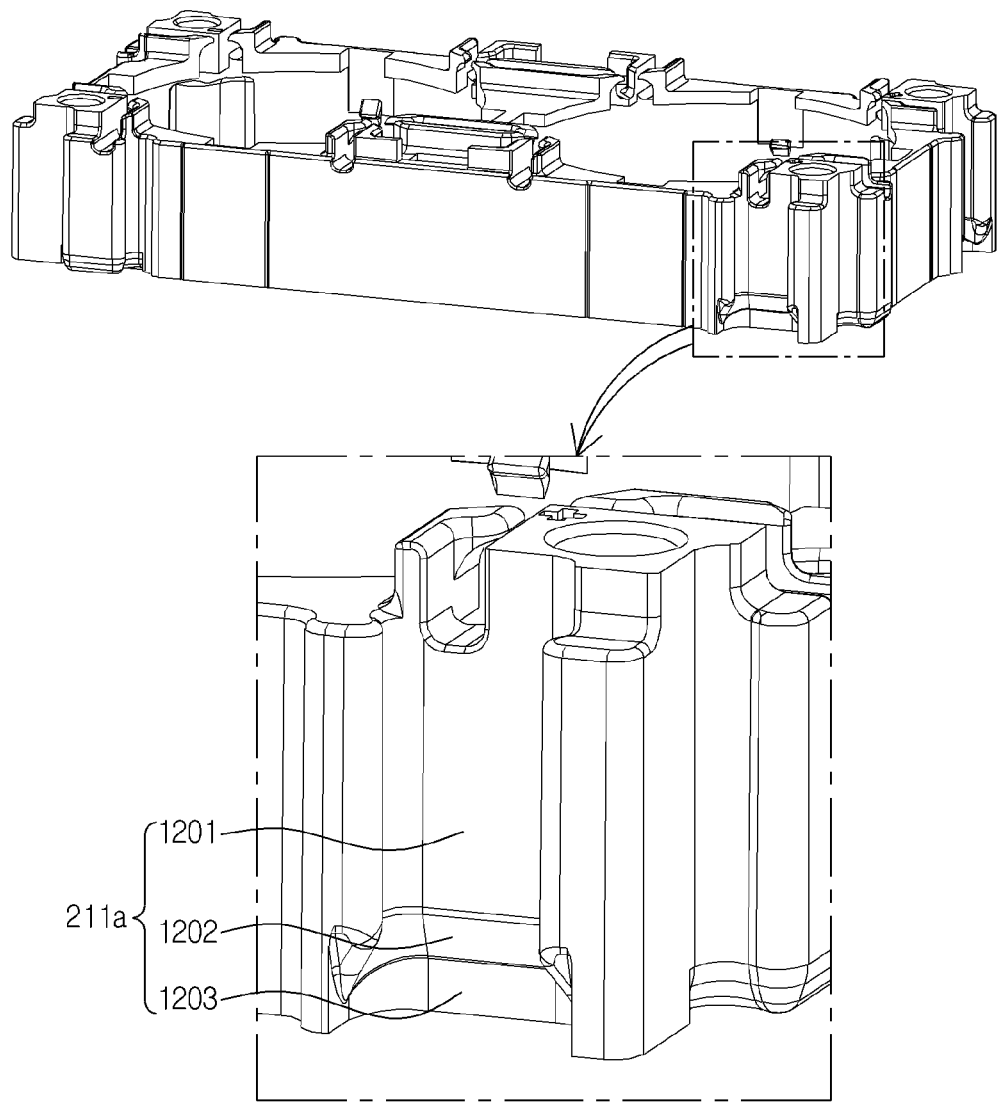
FIG. 12 is an enlarged view showing the accommodation portion of FIG. 11.

FIG. 12 is an enlarged view showing the accommodation portion 211a of FIG. 11. Referring to FIG. 12, the accommodation portion 211a formed in the first side surface of the body 210 includes a first sub accommodation portion 1201, a second sub accommodation portion 1203, and a third sub accommodation portion 1202. The first sub accommodation portion 1201 has a shape corresponding to the coupling protrusions 211b, 212b formed on the first side surface of the body 210 or the second side surface opposite thereto. The second sub accommodation portion 1203 has a greater width than the first sub accommodation portion 1201 and guides the coupling protrusions 211b, 212b to be inserted properly when being inserted into the second sub accommodation portion 1203. If the widths of the first sub accommodation portion 1201 and the second sub accommodation portion 1203 are the same, the positions of the coupling protrusions 211b, 212b should be exactly matched when the coupling protrusions 211b, 212b are inserted into the second sub accommodation portion 1203 of the accommodation portion 211a. However, since the width of the second sub accommodation portion 1203 is greater than the width of the first sub accommodation portion 1201 as in this embodiment, the positions of the coupling protrusions 211b, 212b may not be exactly matched when the coupling protrusions 211b, 212b are inserted into the second sub accommodation portion 1203 of the accommodation portion 211a, thereby increasing the convenience of user. Moreover, since the inclined third sub accommodation portion 1202 is placed between the first sub accommodation portion 1201 and the second sub accommodation portion 1203, when the coupling protrusions 211b, 212b are inserted into the second sub accommodation portion 1203 having a relatively great width, the coupling protrusions 211b, 212b are guided well into the first sub accommodation portion 1201. The slope of the third sub accommodation portion 1202 means that the third sub accommodation portion 1202 is not parallel or perpendicular to the first and second sub accommodation portions 1201, 1203. The structure of the accommodation portion 211a shown in FIG. 12 is equally applied to all of the accommodation portions 211a, 212a, 213a, 214a formed in the side surfaces of the body 210.

Figure 13:
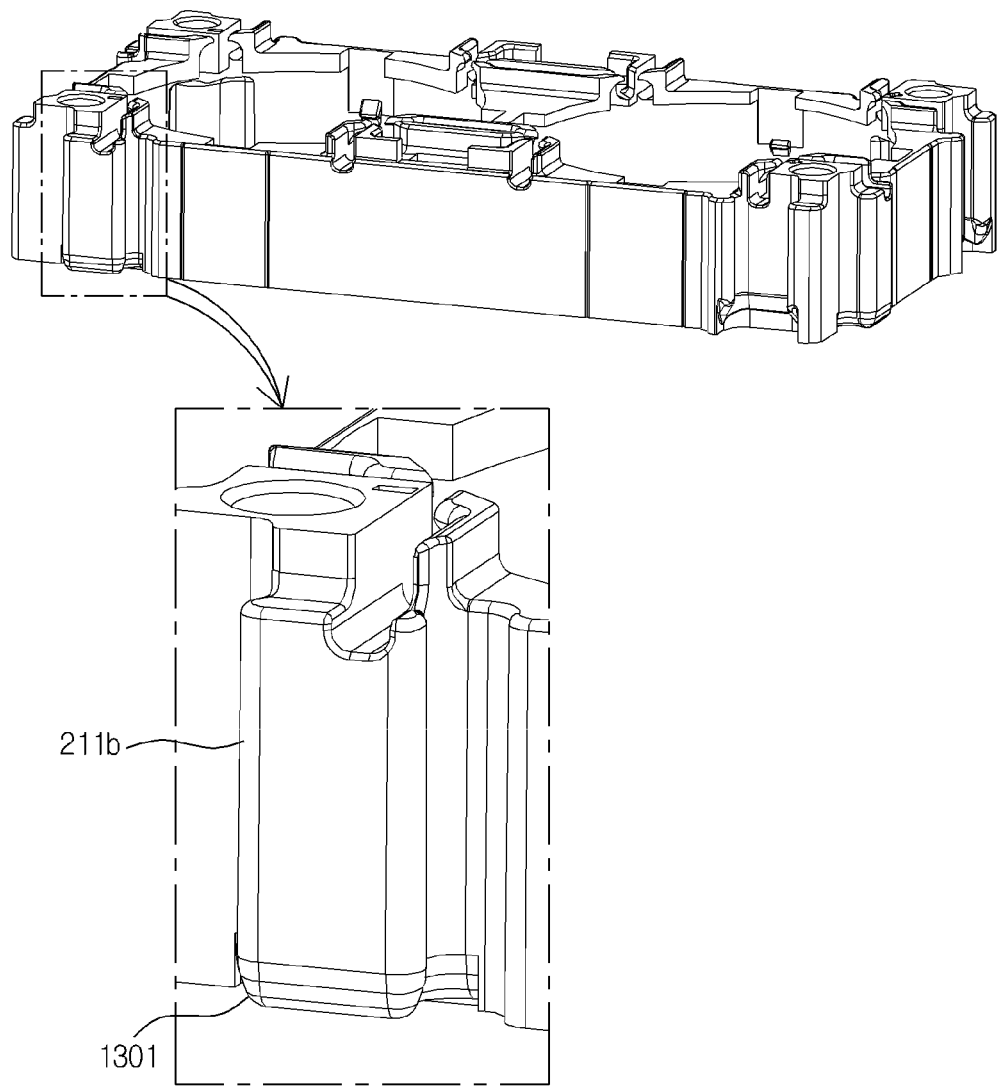
FIG. 13 is an enlarged view showing the coupling protrusion of FIG. 11.

FIG. 13 is an enlarged view showing the coupling protrusion 211b of FIG. 11. Referring to FIG. 13, the lower end of the coupling protrusion 211b formed on the first side surface of the body 210 has a inclined guide surface 1301 with reduced width and thickness. The coupling protrusion 211b may be inserted into the lower end of the accommodation portion 211a, namely into the second sub accommodation portion 1203, or may be inserted into the upper end of the accommodation portion 211a, namely into the first sub accommodation portion 1201. If the coupling protrusion 211b is inserted into the second sub accommodation portion 1203, the coupling protrusion 211b may be easily inserted into the accommodation portion 211a since the width of the second sub accommodation portion 1203 is greater than the width of the coupling protrusion 211b as described above with reference to FIG. 12. However, if the coupling protrusion 211b is inserted into the first sub accommodation portion 1201, their positions should be exactly matched. However, since the inclined guide surface 1301 having a reduced width and thickness is formed at the lower end of the coupling protrusion 211b as shown in FIG. 13, when the coupling protrusion 211b is inserted into the first sub accommodation portion 1201, the coupling protrusion 211b may be easily coupled to the first sub accommodation portion 1201. The structure of the coupling protrusion 211b shown in FIG. 13 is equally applied to all of the coupling protrusions 211b, 212b, 213b, 214b formed on the side surfaces of the body 210.

Figure 14:
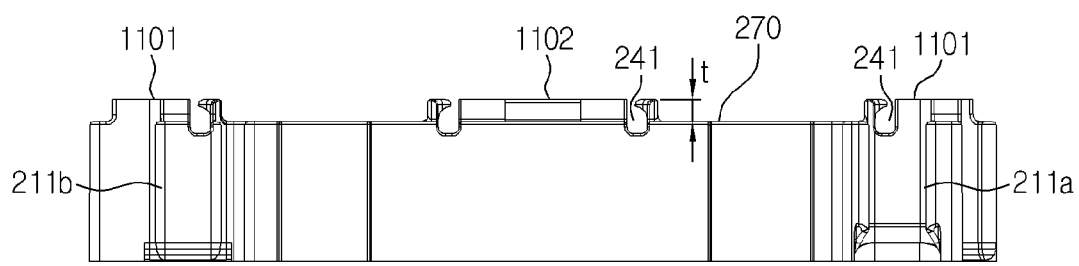
FIG. 14 is a front view showing the fixing device of FIG. 11, viewed in an E direction.

FIG. 14 is a front view showing the fixing device 110 of FIG. 11, viewed in an E direction. As shown in FIG. 14, the bus bar mounting portion 270 for allowing a bus bar to be mounted thereto is formed between the side walls of the guide groove 241 in the fixing device 110 of FIG. 11 and has a height lower than the height of the side walls thereof. The fixing device 110 of FIG. 11 has the bolt insert hole 1101 at four apex portions of the body 210 and also has holes 1102 formed symmetrically in both side surface portions between the two holes 220, 230 to serve as a moving passage of the wiring. The side walls of the guide groove 241, the bolt insert holes 1101, and the hole passage holes 1102 serving as a moving passage of the wiring have approximately the same height, and the bus bar mounting portion 270 has a lower height compared thereto, thereby forming a step.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A fixing device for fixing a plurality of energy storage cells arranged in parallel to each other, the fixing device comprising:
    a body having a hole formed through an upper surface and a lower surface thereof to accommodate a part of at least one energy storage cell, wherein the hole of the body includes:
        a negative electrode accommodation hole formed to accommodate a negative electrode terminal of one energy storage cell, and
        a positive electrode accommodation hole formed to accommodate a positive electrode terminal of another energy storage cell;
    at least two first fixing protrusions formed on an inner circumference of the negative electrode accommodation hole at regular intervals and coupled to a groove formed in an outer circumference of the one energy storage cell;
    at least two second fixing protrusions formed on an inner circumference of the positive electrode accommodation hole at regular intervals and coupled to a groove formed in an outer circumference of the another energy storage cell;
    a first coupling protrusion and a first accommodation portion formed at a first side surface of the body to be spaced apart in opposite directions by the same distance from a center of the first side surface, the first coupling protrusion and the first accommodation portion being shaped to engage with each other; and
    a second coupling protrusion and a second accommodation portion formed at a second side surface of the body, which is opposite to the first side surface, to be spaced apart in opposite directions by the same distance from a center of the second side surface, the second coupling protrusion and the second accommodation portion being shaped to engage with each other.

2. The fixing device according to claim 1, wherein the first accommodation portion and the second accommodation portion include:
    a first sub accommodation portion shaped corresponding to the first coupling protrusion and the second coupling protrusion;
    a second sub accommodation portion having a greater width than the first sub accommodation portion; and
    an inclined third sub accommodation portion formed between the first sub accommodation portion and the second sub accommodation portion.

3. The fixing device according to claim 2, wherein the first coupling protrusion and the second coupling protrusion include:
    an inclined surface formed at an end thereof that is inserted into the first sub accommodation portion.

4. The fixing device according to claim 1, wherein a bus bar mounting portion is formed at the upper surface of the body to have a lower height than surroundings.

5. The fixing device according to claim 1, wherein the first coupling protrusion and the first accommodation portion are point-symmetrical to the second coupling protrusion and the second accommodation portion based on a center of the body.

6. The fixing device according to claim 1, further comprising:
    a third coupling protrusion and a third accommodation portion formed at a third side surface of the body to have an interval therebetween, the third coupling protrusion and the third accommodation portion being shaped to engage with each other; and
    a fourth coupling protrusion and a fourth accommodation portion formed at a fourth side surface of the body, which is opposite to the third side surface, to be point-symmetrical based on a center of the body.

7. The fixing device according to claim 1, wherein inclined surfaces of the first fixing protrusion and the second fixing protrusion at which the energy storage cell is inserted have a smaller slope than inclined surfaces opposite thereto.

8. The fixing device according to claim 1, further comprising:
    two fixing means insert holes symmetrically formed in the upper surface of the body at both sides between the negative electrode accommodation hole and the positive electrode accommodation hole.

9. The fixing device according to claim 1, further comprising:
    polarity indicators formed at four apex portions of the upper surface of the body.

10. The fixing device according to claim 1, further comprising:
    fixing means insert holes formed at four apex portions of the upper surface of the body.

11. The fixing device according to claim 1, further comprising:
    a guide groove connected from the hole of the body to the outside of the body to serve as a moving passage of a wiring,
    wherein the guide groove comprises at least two guide grooves formed at upper, lower, left, and right sides of the upper surface of the body, respectively, and
    wherein the at least two guide grooves formed in parallel sides are point-symmetrical based on a center of the body.

12. The fixing device according to claim 11, wherein a hooking protrusion is formed on at least one side wall of each guide groove to prevent a wiring from being separated.

13. The fixing device according to claim 1, further comprising:
    an extension portion configured to extend at the lower surface of the body from the hole to an empty space toward a side surface of the body.

14. An energy storage module, comprising:

two energy storage cells arranged in parallel so that the energy storage cells have electrode terminals in opposite directions;

a first fixing device configured to accommodate one side surface of the two energy storage cells;

a second fixing device configured to accommodate a side surface of the two energy storage cells opposite to the one side surface, wherein the first and second fixing devices include:
- a body having a negative electrode accommodation hole and a positive electrode accommodation hole formed through an upper surface and a lower surface thereof,
- a first coupling protrusion and a first accommodation portion formed at a first side surface of the body to be spaced apart in opposite directions by the same distance from a center of the first side surface, the first coupling protrusion and the first accommodation portion being shaped to engage with each other, and
- a second coupling protrusion and a second accommodation portion formed at a second side surface of the body, which is opposite to the first side surface, to be spaced apart in opposite directions by the same distance from a center of the second side surface, the second coupling protrusion and the second accommodation portion being shaped to engage with each other;

a bus bar having two hollows through which positive electrode terminals and negative electrode terminals of the energy storage cells protruding to the outside from the negative electrode accommodation hole and the positive electrode accommodation hole passes;

nuts fastened to the positive electrode terminals and the negative electrode terminals passing through the two hollows of the bus bar; and a heat dissipation pad installed in contact with the nut.

15. The energy storage module according to claim 14, wherein a side wall for guiding installation locations of the bus bar and the heat dissipation pad is formed at the upper surface of the body, and wherein a height of the side wall is greater than a height of the nut protruding from the holes and stacked thereon and is smaller than a height of the heat dissipation pad.

* * * * *

UNITED STATES PATENT AND TRADEMARK OFFICE
CERTIFICATE OF CORRECTION

| | |
|---|---|
| PATENT NO. | : 11,177,081 B2 |
| APPLICATION NO. | : 16/465032 |
| DATED | : November 16, 2021 |
| INVENTOR(S) | : Jung-Gul Lee |

It is certified that error appears in the above-identified patent and that said Letters Patent is hereby corrected as shown below:

On the Title Page

The (71) Applicant section should appear as:
(71) Applicant: LS MATERIALS CO., LTD., ANYANG-SI, GYEONGGI-DO, (KR)

The (73) Assignee section should appear as:
(73) Assignee: LS MATERIALS CO., LTD., ANYANG-SI, GYEONGGI-DO, (KR)

Signed and Sealed this
Twentieth Day of September, 2022

Katherine Kelly Vidal
*Director of the United States Patent and Trademark Office*